United States Patent [19]

Jumel

[11] 4,187,328
[45] Feb. 5, 1980

[54] METHOD OF PREPARING POSITIVE ACTIVE MATERIAL FOR ELECTRIC PRIMARY CELLS

[75] Inventor: Yves Jumel, Poitiers, France

[73] Assignee: Saft-Societe des Accumulateurs Fixes et de Traction, Romainville, France

[21] Appl. No.: 915,986

[22] Filed: Jun. 16, 1978

Related U.S. Application Data

[62] Division of Ser. No. 865,517, Dec. 29, 1977, Pat. No. 4,125,689.

[30] Foreign Application Priority Data

Dec. 30, 1976 [FR] France .................. 76 39572

[51] Int. Cl.² .................. H01M 4/54; H01M 6/04
[52] U.S. Cl. .................. 427/8; 252/514; 427/125; 427/217; 428/403; 428/469; 429/219
[58] Field of Search .................. 427/8, 399, 125, 216, 427/217; 428/403, 469; 252/514, 182.1; 429/219

[56] References Cited

U.S. PATENT DOCUMENTS

| | | | |
|---|---|---|---|
| 3,663,276 | 5/1972 | Allington et al. | 427/8 |
| 4,009,056 | 2/1977 | Megahed et al. | 429/206 |
| 4,015,056 | 3/1977 | Megahed et al. | 429/219 |
| 4,034,126 | 7/1977 | Funakoshi et al. | 427/8 |
| 4,038,467 | 7/1977 | Lippold et al. | 429/219 |
| 4,048,402 | 9/1977 | Kronenberg | 429/194 |
| 4,048,405 | 9/1977 | Megahed | 429/219 |

*Primary Examiner*—John D. Smith
*Assistant Examiner*—Stuart D. Frenkel
*Attorney, Agent, or Firm*—Kenyon & Kenyon

[57] ABSTRACT

A positive active material for electric primary cells, such as are used in electronic watches, is formed from a powder composed at least partially of grains having cores of silver peroxide completely surrounded by a layer of monovalent silver oxide and covered with a thin surface layer of metallic silver. The remainder of the powder, if any, comprises monovalent silver oxide grains, also covered with a thin surface layer of metallic silver. A process for making the material includes adding a reducing agent such as hydrazine to a powder having grains of less than 50 microns in diameter of essentially pure silver peroxide and reducing the silver peroxide to the point at which a thin layer of metallic silver forms on the surface of each powder grain. This point can be detected by a substantial reduction in electrical resistivity of the powder and occurs when approximately one-half of the original powder remains as silver peroxide.

3 Claims, 1 Drawing Figure

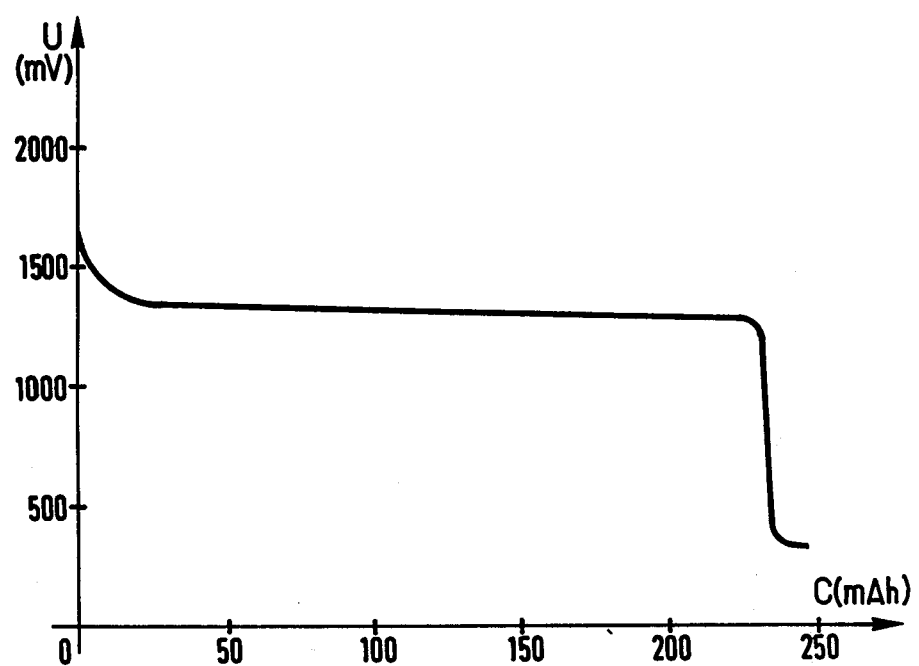

METHOD OF PREPARING POSITIVE ACTIVE MATERIAL FOR ELECTRIC PRIMARY CELLS

This is a division of application Ser. No. 865,517 filed Dec. 29, 1977, now U.S. Pat. No. 4,125,689, Nov. 14, 1978.

BACKGROUND OF THE INVENTION

1. Field of the Invention

The present invention relates to a positive active material for primary electric cells which are to discharge at a constant voltage level, and more particularly to a positive active material composed principally of silver oxides.

2. Description of the Prior Art

It is known that when silver peroxide discharges, it passes through the monovalent silver oxide state, resulting in the disadvantage that discharge occurs at two voltage levels of unequal duration. This disadvantage can be avoided by use of monovalent silver oxide, which discharges at a single voltage level, but this results in an appreciable reduction of storage capacity for the same cell dimensions.

It has been proposed recently to use silver peroxide as the main active material, but to dispose a layer of monovalent silver oxide between the cathode current collector and the silver peroxide. The monovalent silver oxide is impermeable to the electrolyte and is the first of the oxides to discharge. The discharge of the monovalent silver oxide produces metallic silver, which reacts with the silver peroxide to form additional monovalent silver oxide, which discharges in its turn, and so on. In this way, the silver peroxide effectively discharges at a single voltage level, that of the monovalent silver oxide.

The resulting structure of the cell is complicated, however, because the active material must be disposed in several successive layers. Furthermore, silver peroxide is not very stable; it tends to decompose, evolving oxygen. The result is that when cells in which the active material constitutes silver peroxide, even in part, internal overpressures occur which can lead to the bursting of the cell.

SUMMARY OF THE INVENTION

The present invention avoids the above-described disadvantages by providing a positive active material for primary electric cells in the form of a powder, wherein the powder comprises grains having cores of silver peroxide entirely surrounded by a layer of monovalent silver oxide, any remaining grains being made of monovalent silver oxide, and both kinds of grain being covered with a thin surface layer of metallic silver.

Since, in each grain having a core of silver peroxide, the core is surrounded by a layer of monovalent silver oxide, the monovalent silver oxide is the first to begin reduction, yielding metallic silver. The silver then reacts with the peroxide core of the grain to form additional monovalent silver oxide. The reduction potential of the monovalent silver oxide is lowered, therefore, without the necessity to provide several layers of active material. As a result, the active material of this invention can be compressed directly in a cell against the metal of the casing of the cell and can be directly in contact with the electrolyte.

Such a powder also has perfect stability. Even at a relatively high temperature (60° C.), practically no evolution of oxygen has been observed in storage. Furthermore, the metallic silver acts as a conductor of electrons in the active material, which is formed of oxides that are not very conductive. The metallic silver is in contact exclusively with the monovalent silver oxide, since the peroxide is completely surrounded by a layer of monovalent silver oxide and, therefore, remains stable. Consequently, it is no longer necessary to add an electronically conductive powder to the active material, as was the case in the prior art, whenever a relatively high discharge rate was required for the cell.

The present invention also provides a method of preparing the active material defined above. The method comprises treating a silver peroxide powder with a controlled quantity of reducing agent to reduce a superficial layer of each grain of silver peroxide first to the state of monovalent oxide, and then to reduce the surface of said layer to the state of metallic silver. Advantageously, this reduction can be effected by a wet method, and hydrazine is a reducing agent which has given very good results.

The quantity of hydrazine is calculated so that the reduction will produce silver, but only a very thin layer of silver. This quantity will depend therefore on the grain size of the powder, since it must correspond to a given thickness of monovalent silver oxide. A simple means of determining the moment when the required amount of reduction is obtained is to measure the resistivity of the silver oxide powder. The appearance of the superficial layer of silver is accompanied by a substantial reduction of the resistivity. If the powder includes grains having radii less than the thickness of the resulting layer of monovalent silver oxide, these grains will be completely reduced. The reduced powder therefore may include "fines" of monovalent silver oxide, which will also be provided with a surface layer of metallic silver.

The invention will be better understood from the example described hereinbelow.

BRIEF DESCRIPTION OF THE DRAWING

The single FIGURE shows the discharge curve of a cell produced in accordance with the invention.

DESCRIPTION OF THE PREFERRED EMBODIMENT

The first phase in constructing a cell according to the present invention is the preparation of the cathode mass. To do this, the process starts with, for example, one gram of pure silver peroxide powder, the grains of which have a diameter of less than 50 microns. Previous tests have shown that, with this powder, the silver layer forms when the silver peroxide has been reduced by about 50%. Its formation is detected by a substantially lowered resistivity of the powder, indicating that the required degree of reduction has been obtained. At this point, from an initial 1 gram of pure silver peroxide powder, there will remain 0.5 grams, while the quantity of monovalent silver oxide formed must be about 0.468 grams (if the relatively very low quantity of metal silver is neglected). This corresponds to a theoretical cell capacity of 324.57 mAh.

The powder thus obtained is washed, dried and compressed at a pressure of 2 T/cm$^2$ in the cathode cup of a button type cell with the following outside dimensions: diameter 11.6 mm, height 5.4 mm. Zinc powder in a quantity corresponding to the theoretical capacity determined above is compressed in the anode cup. A separator, composed of a cellulose felt next to the zinc and of a microporous barrier next to the silver oxide powder is disposed between the electrodes thus formed. A potassium hydroxide solution wetting the whole is added. After the interposition of a seal ring, the edge of the cathode cup is crimped on the edge of the anode cup.

A cell thus obtained has been discharged continuously through a 200-ohm resistor. Its discharge curve is shown in the FIGURE, in which the discharge capacity C in mAh is shown along the abscissa, and the voltage U in mV is shown along the ordinate.

The cell gave a capacity of 243 mAh on a single discharge curve as can be seen in the FIGURE. The efficiency is therefore 74.9%. A previous test had shown that through a resistor of 30 ohms, the voltage of the cell was 1400 mV.

Such a cell is very suitable for use in electronic watches, even watches with light-emitting diode displays, due to the presence of the surface layer of metallic silver on the cathode grains, which reduces the resistance of the cathode mass.

What is claimed is:

1. A method of preparing a positive active material for primary electric cells, the method comprising:
   adding a predetermined quantity of a reducing agent to a selected amount of silver peroxide powder sufficient to reduce an outer layer of each grain of said powder until a layer of metallic silver is formed on the surface of each of the powder grains;
   reducing said powder with said reducing agent;
   measuring the resistance of said powder; and terminating said reducing step as soon as the resistivity of said powder significantly decreases, thereby indicating the formation of a thin surface layer of metallic silver on the grains of said powder.

2. The method of claim 1 wherein the reducing agent comprises hydrazine.

3. The method of claim 1 wherein said predetermined quantity of a reducing agent is just sufficient to reduce approximately one-half of the silver peroxide powder.

* * * * *